(12) United States Patent
Suzuki

(10) Patent No.: US 7,040,858 B2
(45) Date of Patent: May 9, 2006

(54) WIND POWER GENERATOR, WINDMILL, AND SPINDLE AND BLADE OF THE WINDMILL

(75) Inventor: Masahiko Suzuki, Hamakita (JP)

(73) Assignee: Global Energy Co., LTD, (JP)

( * ) Notice: Subject to any disclaimer, the term of this patent is extended or adjusted under 35 U.S.C. 154(b) by 106 days.

(21) Appl. No.: 10/498,736

(22) PCT Filed: Dec. 13, 2002

(86) PCT No.: PCT/JP02/13069

§ 371 (c)(1),
(2), (4) Date: Jun. 14, 2004

(87) PCT Pub. No.: WO03/052268

PCT Pub. Date: Jun. 26, 2003

(65) Prior Publication Data

US 2005/0084373 A1    Apr. 21, 2005

(30) Foreign Application Priority Data

| Dec. 14, 2001 | (JP) | 2001-381532 |
| Dec. 27, 2001 | (JP) | 2001-397751 |
| Jan. 22, 2002 | (JP) | 2002-013467 |
| Mar. 22, 2002 | (JP) | 2002-081690 |
| Apr. 11, 2002 | (JP) | 2002-109567 |
| May 23, 2002 | (JP) | 2002-149077 |
| Jul. 11, 2002 | (JP) | 2002-202769 |
| Jul. 26, 2002 | (JP) | 2002-218731 |
| Aug. 1, 2002 | (JP) | 2002-225177 |
| Dec. 2, 2002 | (JP) | 2002-349939 |

(51) Int. Cl.
*F03D 3/06* (2006.01)

(52) U.S. Cl. .................. 415/4.2; 415/907; 416/132 B; 416/210 R; 416/241 A

(58) Field of Classification Search ............... 415/4.2, 415/4.4, 907; 416/132 A, 132 B, 228, 230, 416/241 A, 210 R, 197 A
See application file for complete search history.

(56) References Cited

U.S. PATENT DOCUMENTS

| 4,204,805 A | * | 5/1980 | Bolie | 416/119 |
| 4,247,253 A | * | 1/1981 | Seki et al. | 416/44 |
| 4,433,544 A | * | 2/1984 | Wells et al. | 60/641.12 |
| 4,452,568 A | * | 6/1984 | Andersson | 416/119 |
| 4,681,512 A | | 7/1987 | Barnard | |
| 4,900,227 A | * | 2/1990 | Trouplin | 416/132 B |

(Continued)

FOREIGN PATENT DOCUMENTS

EP    1096144 A2    5/2001

(Continued)

OTHER PUBLICATIONS

International Search Report, dated Mar. 18, 2003.

*Primary Examiner*—Ninh H. Nguyen
(74) *Attorney, Agent, or Firm*—Fulwider Patton LLP

(57) ABSTRACT

A wind power generator has a windmill for rotating the generator. The windmill includes a main vertical shaft, a rotor, and a wind-receiving blade. The rotor, fixed horizontally at the upper end of the main vertical shaft, comprises a flywheel, and a plurality of wind-receiving blades is spaced equally on the circumference of the rotor. The rotor gives kinetic energy by rotation inertia to the windmill. The wind-receiving blade is excellent in bending properties, and even when it receives breeze, the main vertical shaft is rotated with the principle of leverage.

6 Claims, 11 Drawing Sheets

U.S. PATENT DOCUMENTS 6,147,415 A 11/2000 Fukada
6,913,435 B1 * 7/2005 Seki .................... 415/4.1

FOREIGN PATENT DOCUMENTS

| GB | 2000556 A | 1/1979 |
| --- | --- | --- |
| JP | 54-121345 A | 9/1979 |
| JP | 1-305167 A | 12/1989 |
| JP | 8-4647 A | 1/1996 |
| JP | 2001-271738 A | 10/2001 |
| JP | 2001-289148 A | 10/2001 |
| WO | WO 98/54463 A1 | 12/1998 |

* cited by examiner

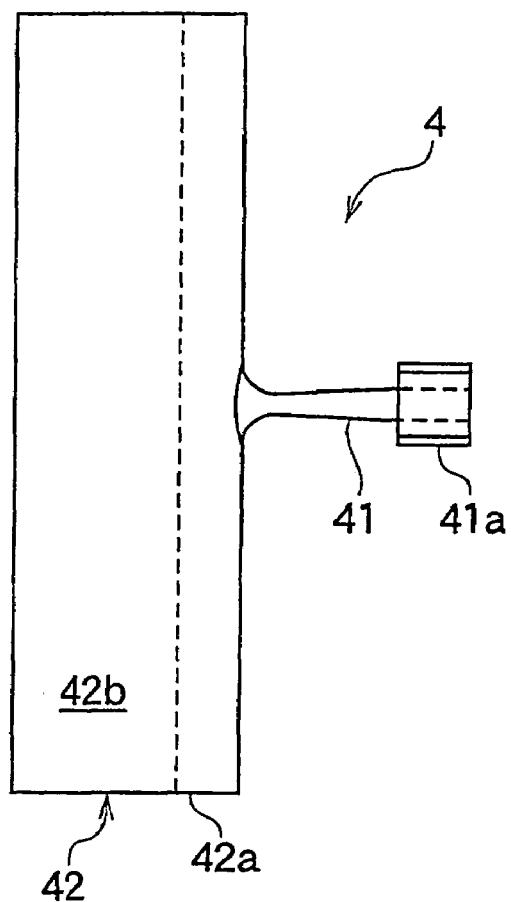
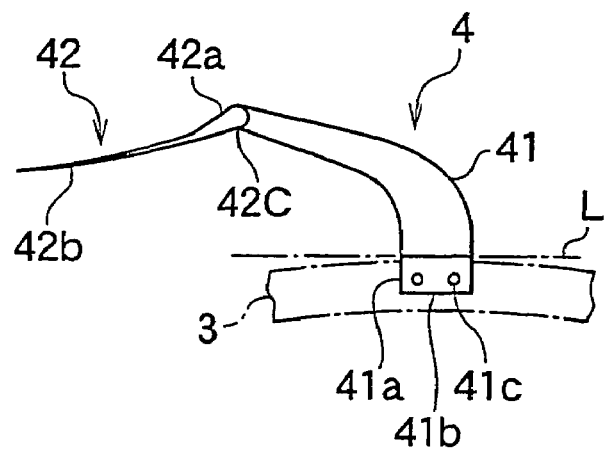

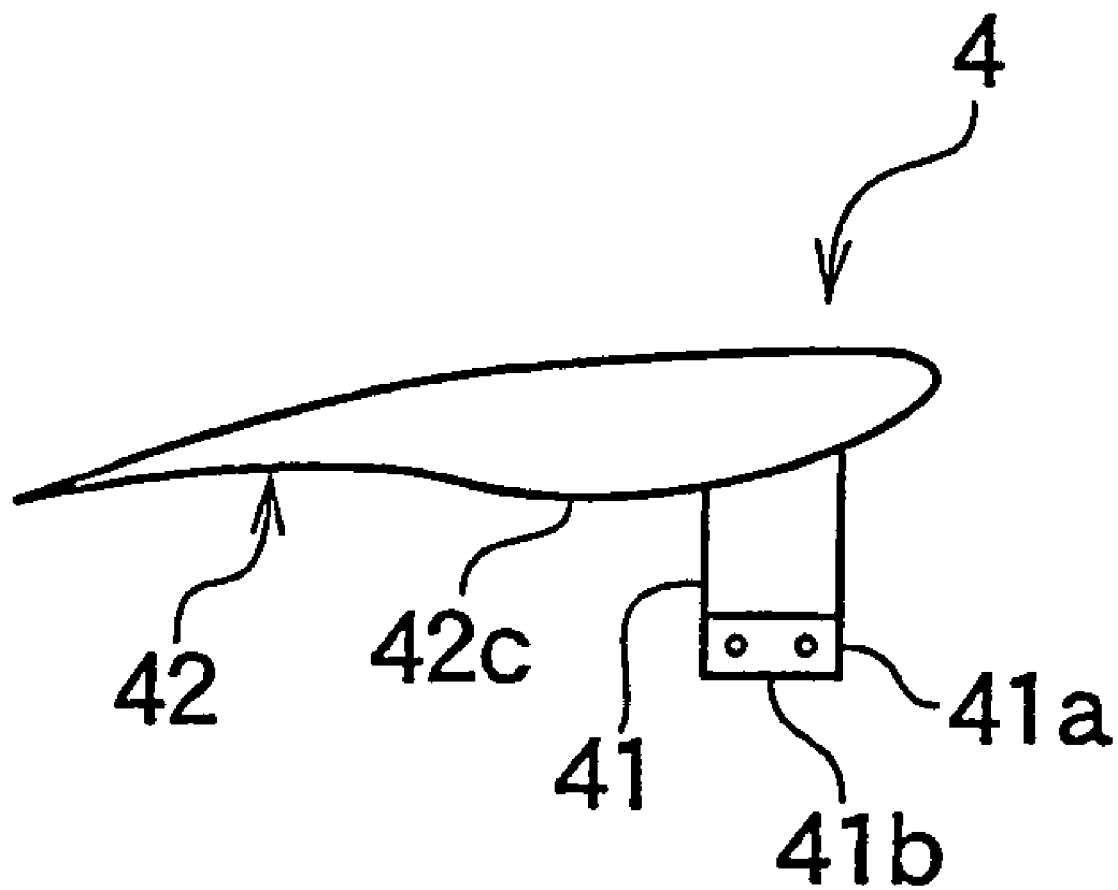

WIND POWER GENERATOR, WINDMILL, AND SPINDLE AND BLADE OF THE WINDMILL

Related Applications:

This is a U.S. national phase of PCT/JP02/13 069 filed 13 Dec. 2002, claiming priority from JP 2001-381532 filed 14 Dec. 2001; JP 2001-397751 filed 27 Dec. 2001; JP 2002-013467 filed 22 Feb. 2002; JP 2002-081690 filed 22 Mar. 2002; JP 2002-109567 filed 11 Apr. 2002; JP 2002-149077 filed 23 May, 2002; JP 2002-202769 filed 11 Jul. 2002; JP 2002-218731 filed 26 Jul. 2002; JP 2002-225177 filed 01 Aug. 2002; and JP 2002-349939 filed 02 Dec. 2002.

TECHNICAL FIELD

The present invention relates to a wind power generator, a windmill for the power, its main shaft and a blade, and especially to a wind power generator, a windmill, its main shaft and a blade which can achieve high torque and comply with wind power conditions of an installed place.

BACKGROUND ART

To generate electricity, hydraulic power, thermal power or atomic power is utilized, which involves disadvantages such as natural destruction with a dam, fuel shortage, air pollution and radioactivity injuries. Clean natural energy such as solar generation and wind power generation has been remarked over the whole world.

Wind power recovery rate by a windmill would be 45% in a horizontal shaft type and 35% in a vertical shaft type. Thus, in wind power generation, a horizontal-shaft-propeller-type windmill is mainly employed.

However, there are disadvantages as below. Unless wind at average wind velocity of 4 m/sec blows for over 2000 hours a year, it will not be profitable. Especially, in a large-size generator, unless wind of more than 7 m/sec blows, a windmill will not be rotatable. Wind at higher position blows faster. Hence it is necessary in a propeller-type wind power generator not only to increase the length of a propeller but also to increase height of a tower on which the generator is mounted. There are disadvantages in rigidity of a propeller, costs for transportation and installation, maintenance and place for installation.

In view of the disadvantages, an object of the invention is to provide a wind power generator, a windmill used therein, a main shaft and a blade where:

(1) generation rate in a small wind power generator becomes higher;
(2) a windmill is set or changed to the structure to achieve average wind velocity in geographical conditions of the installation place;
(3) the structure of the windmill can be changed after the wind power generator is installed;
(4) the light, high-rigidity windmill can be easily transported and assembled; and
(5) the wind power generator is made smaller to reduce cost and to expand selective range of the installation place.

SUMMARY OF THE INVENTION

To solve the disadvantages, according to the present invention, a windmill having main vertical shaft is employed, and a wind-receiving blade is spaced from the shaft to apply leverage action.

A rotor is constructed as flywheel, and kinetic energy by rotation inertia is used. The wind-receiving blade has a lobe on the inner surface of a wind-receiving portion to increase rotation-driving force.

BRIEF DESCRIPTION OF THE DRAWINGS

FIG. 9 is a left side view of the third embodiment of a wind-receiving blade according to the present invention;

FIG. 10 is a top plan view of the wind-receiving blade in FIG. 9;

FIG. 19 is a top plan view of the sixth embodiment of a wind-receiving blade according to the present invention.

DETAILED DESCRIPTION OF PREFERRED EMBODIMENTS

Figure 1:
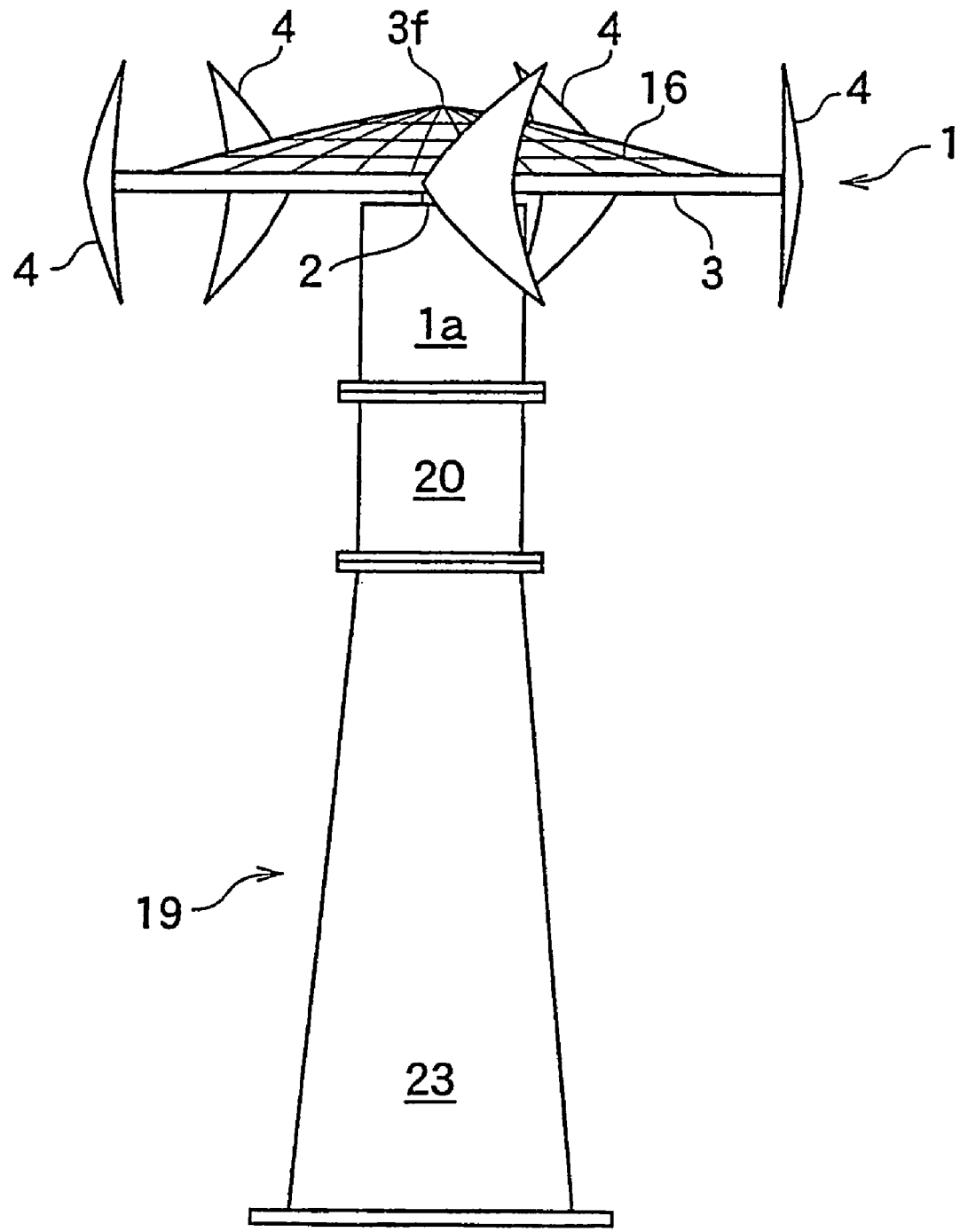
FIG. 1 is a front elevational view of a wind power generator according to the present invention.
Figure 2:
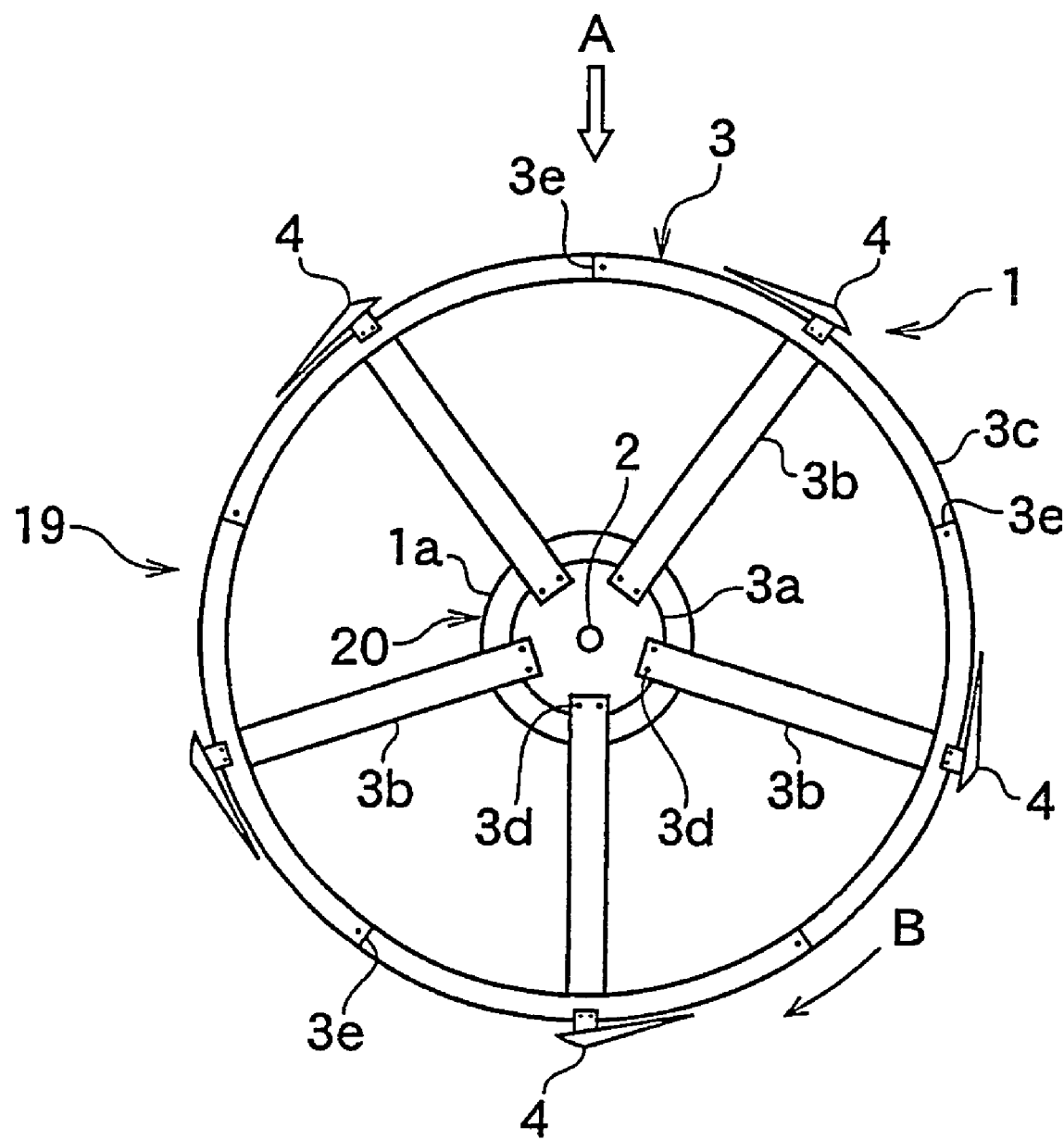
FIG. 2 is a top plan view of the wind power generator from which a cover is removed.
Figure 3:
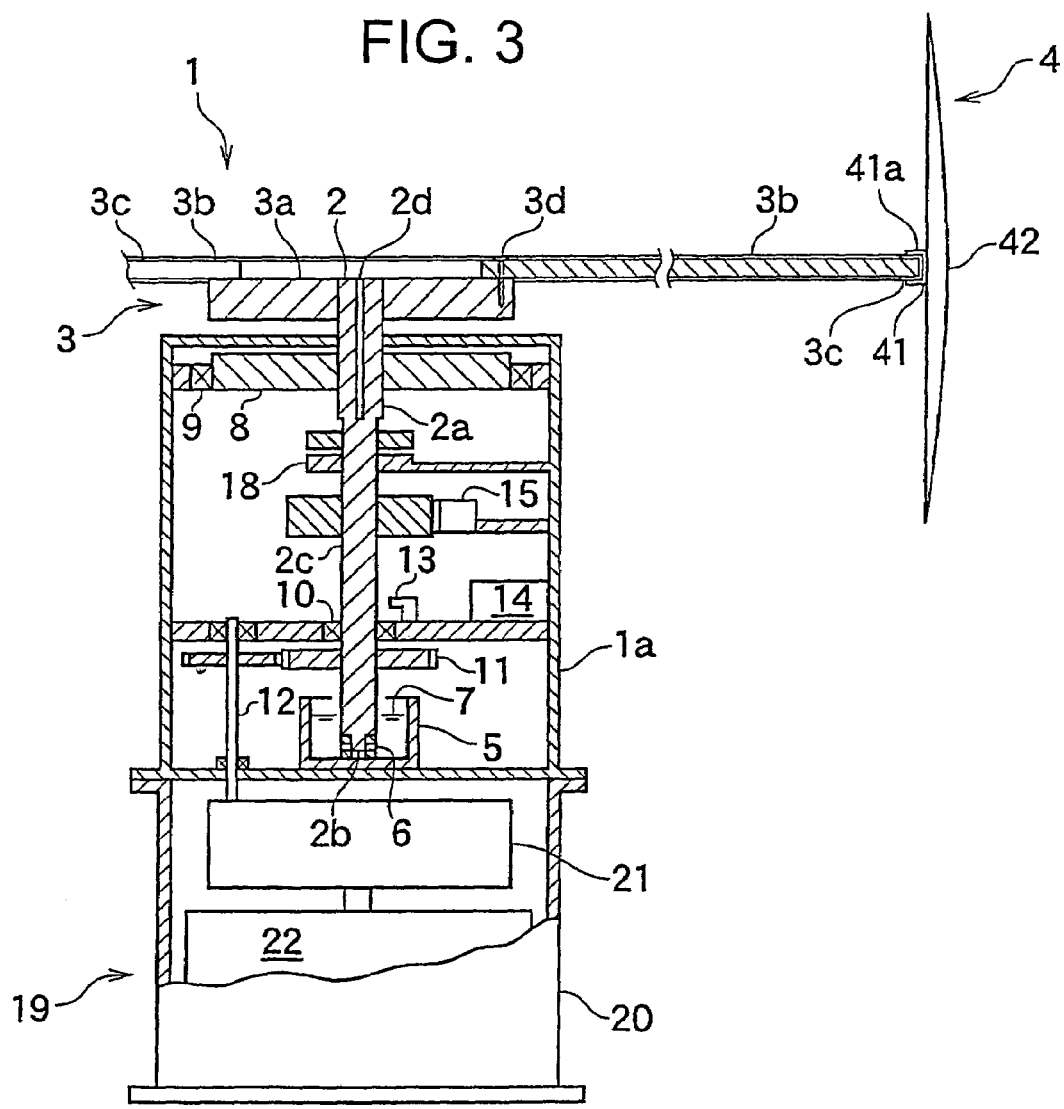
FIG. 3 is a vertical sectional front view of the wind power generator.
Figure 4:
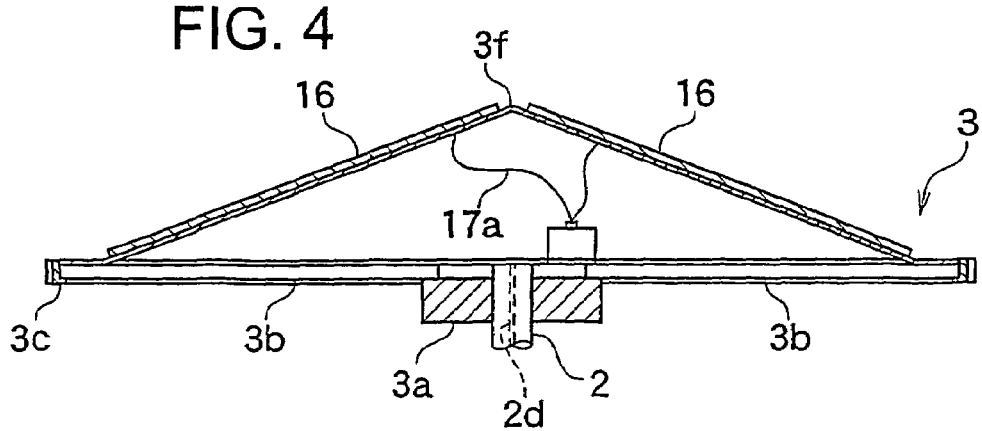
FIG. 4 is a vertical sectional front view of a rotor over which the. cover is mounted in the wind power generator.
Figure 5:
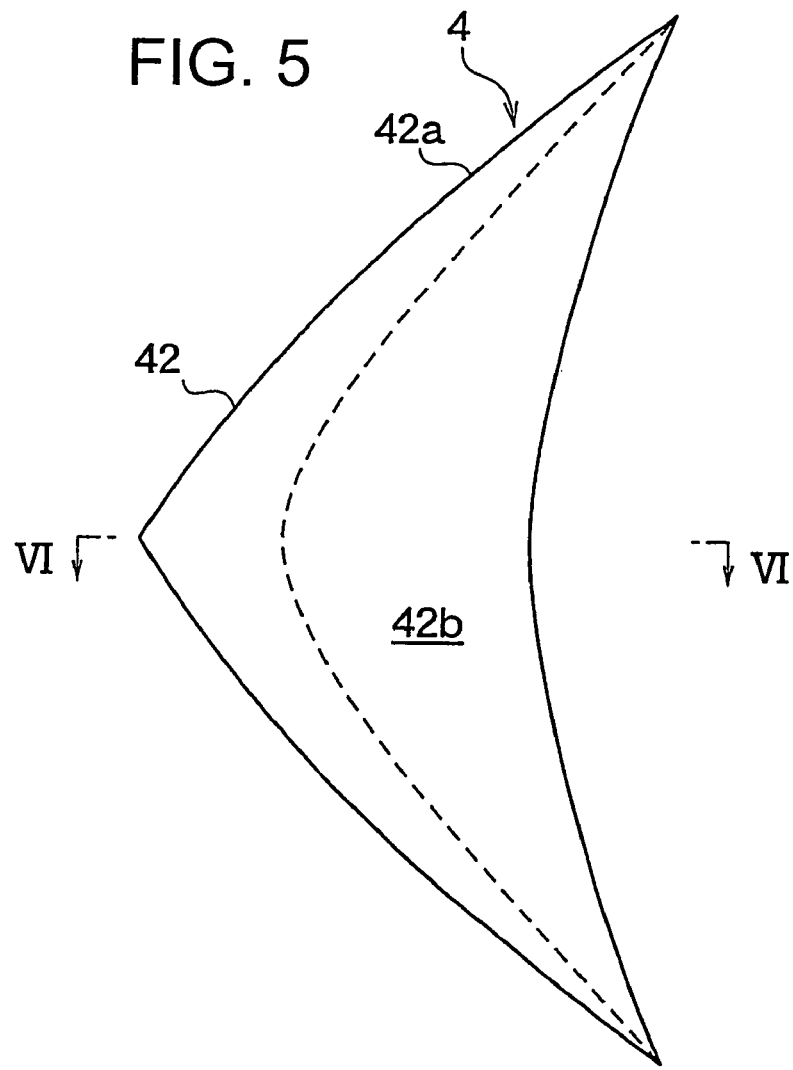
FIG. 5 is a right side view of the first embodiment of a wind-receiving blade according to the present invention.
Figure 6:
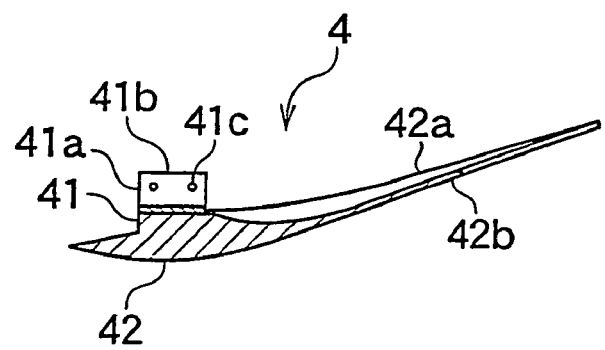
FIG. 6 is a horizontal sectional view taken along the line VI—VI.

A best mode for carrying out this invention will be described with respect to drawings. FIG. 1 is a front elevational view of a wind power generator according to the present invention; FIG. 2 is a top plan view of the wind power generator in which a cover is removed; FIG. 3 is a vertical sectional front view of a windmill in which a cover is removed; FIG. 4 is a vertical sectional front view of a rotor over which the cover is mounted; FIG. 5 is a right side view of a wind-receiving blade; and FIG. 6 is a horizontal sectional view taken along the line A—A.

In FIG. 1, in a wind power generator 19, a windmill 1 having a vertical shaft is mounted at the upper end of a generating unit 20.

In the generating unit 20, an ordinary dynamo 22 is provided and connected to an output shaft 12 via a transmission 21 in FIG. 3.

Numeral 23 in FIG. 1 denotes an FRP tower, which comprises a plurality of layers vertically, thereby allowing its height to change.

In the wind power generator 19, wind blows towards wind-receiving blades 4 spaced equally on the circumference of a rotor 3 to allow the rotor 3 to rotate. As shown in FIGS. 2 and 3, with rotation of a main vertical shaft 2, the output shaft 12 is rotated, thereby rotating the dynamo 22 of the generating unit 20 of a wind power generator 19 in FIG. 1 to generate electricity. The number of rotation of the main vertical shaft 2 is detected by a rotation sensor 13 in FIG. 3, inputted to an automatic controller and calculated arithmetically. If the number of rotation exceeds a certain number, an electromagnetic brake 15 is actuated by the automatic controller 14 to brake the main vertical shaft 2 thereby preventing excessive rotation of the windmill 1 by strong wind.

In case of typhoon, delayed rotation of the rotor 3 with braking and rear curve of the wind-receiving blades 4 avoid damage to the blades 4. Automatic switching control of gear ration of the transmission owing to the automatic controller 14 causes slow-down.

Wind is variable depending on seasons and time and never blows in the same way. Even if the wind power generator 19 is installed after investigation about geometric conditions, the wind-receiving blades 4 could not comply with generation volume of the dynamo 22 in size, number and shape.

In this invention, the wind-receiving blades 4 are light. The circumference 3c is engaged in a fixed portion 4a and a bolt is fixed in a thread bore 41c thereby allowing the blades 4 to be exchanged, so that the most suitable blades 4 can be selected, which is advantageous.

Suitable shapes of the blade 4 will be illustrated later.

In FIG. 2, the windmill 1 of the wind power generator 19 comprises the main vertical shaft 2; the horizontal rotor 3; and a plurality of wind-receiving blades 4 spaced equally on the circumference of the rotor 3.

As shown in FIG. 3, in the main vertical shaft 2, an upper portion 2a fixed to the rotor 3 has diameter such as 100 mm, and a smaller diameter portion 2b such as 10 mm at the lower end. To reduce frictional contact area during rotation, the smaller diameter portion 2b may be preferably made as thin as possible such as 0.5 to 50%, more preferably 0.5 to 20% of the diameter of the upper portion 2a. A vertical intermediate portion 2c of the main vertical shaft 2 can be made smaller in diameter than the upper portion 2a so far as its rigidity is kept.

The smaller diameter portion 2b of the main vertical shaft 2 is supported by a thrust bearing 6 in an oil basin 5 at the bottom of a casing 1a. The oil basin 5A is filled with lubricating oil. The thrust bearing 6 bears the weight of the rotor 3 fixed to the main vertical shaft 2. The smaller-diameter portion 2b of the thrust bearing 6 has smaller contact area to reduce frictional resistance significantly during rotation of the main vertical shaft 2 thereby increasing rotating efficiency. Under the oil cup 2, elevating means (not shown) is provided, and the oil cup 5 is lowered for maintenance, so that the thrust bearing 6 therein is substituted and the oil cup 5 is elevated to bear the main vertical shaft 2.

The main vertical shaft 2 may be supported by a bearing (not shown) to reduce frictional contact. The lower end of the main vertical shaft 2 may be conical and/or made of ceramic.

To the upper portion 2a of the main vertical shaft 2 in the casing 1a, a larger-diameter collar 8 is mounted and has a radial bearing on the circumference of the collar 8 thereby preventing radial vibration during rotation of the rotor 3.

If necessary, a radial bearing 10 is provided on the circumference of the intermediate portion 2c of the main vertical shaft 2 thereby preventing radial vibration of the lower portion of the main vertical shaft 2. Instead of the radial bearing, a linier motor may be provided.

An output gear 11 is provided on the lower portion of the intermediate portion 2c of the main vertical shaft 2. Numeral 12 denotes an output shaft for outputting to a transmission 21 connected to a dynamo 22 of the wind power generator 19 in FIG. 3.

When the diameter of the rotor 3 increases, such as 10 m, the longer the main vertical shaft 2, the more stable the generator becomes. In this case, the dynamo 22 may be disposed at the same as or above the oil cup 5.

Numeral 13 in FIG. 3 denotes a rotation sensor which detects the number of rotation of the main vertical shaft 2 to input detected data into an automatic controller 14 in which the numerical value of rotation from the rotation sensor is calculated to control an electromagnetic brake 15 automatically. Numeral 18 denotes an electromagnet having different magnet poles vertically between the casing 1a and the intermediate portion 2c of the main vertical shaft 2 to elevate the main vertical shaft 2 thereby reducing frictional contact pressure of the thrust bearing 6.

As shown in FIG. 2, on the rotor 3 of the windmill 1, a plurality of support arms 3b such as five in this figure are equally spaced on the circumference of an axial portion 3a. The outer end of each of the support arms 3b is connected to a circumferential ring 3c.

As shown in FIG. 3, each of the support arms 3b is detachably secured to the axial portion 3a with a bolt 3d and to the circumferential ring 3c with a bolt 3d. The support arm 3b has a wing-like section and is made of metal covered with FRP or fluorine resin film to provide rust proofing and durability. Stainless steel may be used.

The circumferential ring 3c has a U-shaped section and a plurality of connecting portions 3c in FIG. 2. The connecting portion 3c is connected by a faucet joint (not shown), so that the circumferential ring 3c can be disassembled for transportation.

The circumferential ring 3c has a diameter of 4 m or more, height of 6 to 8 cm or more and weight of 200 to 250 kg or more, and is made of steel. The section is U-shape, L-shape, tubular, rectangular or others. The weight can be increased by bonding a steel to the inner circumference of the circumferential ring 3c. The surface of the circumferential ring 3c can be ordinarily coated or covered with FRP. Thus, the rotor 3 of the windmill 1 constitutes a flywheel by comprising the axial portion 3a, the support arms 3b and the circumferential ring 3c thereby employing kinetic energy of the mass by rotation inertia to increase torque efficiently. The circumferential ring 3c is annular to provide stable rotation.

Without changing the size of the axial portion, the longer the support arm is, the longer its radius is. The circumferential ring 3c having radius corresponding to the length of the support arm 3b is selected to make the rotor 3 to have a larger radius. Of course, the radius can be made smaller. Depending on output from the dynamo 22 and blowing conditions in the place in which it is installed, diameter of the rotor 3, weight of the circumferential ring 3c as flywheel and size and the number of the wind-receiving blades 4 can be determined.

The rotor 3 can be assembled and disassembled easily, which is advantageous in transportation and working efficiency.

Instead of the support arm 3b, a disc (not shown) is fixed over the axial portion 3a concentrically and the circumferential ring 3c is fixed over the circumference of the disc.

For example, the rotor 3 is 4 m in diameter, 12.56 m in circumference and 20 kg in weight. When the circumference rotates at speed of 2 m/sec (7.2 km/h), the momentum is calculated by the following formula:

$$P=mv$$

where P is momentum, m is mass and v is velocity. Thus, "P" is 400 kg·m/sec which equals 200 kg multiplied by 2 m/sec.

The rotor 3 comprises a flywheel thereby applying kinetic energy to torque.

For example, when it requires force of 100 to rotate the main vertical shaft 2 having a diameter of 10 cm, it requires the force of 100 to rotate the main vertical shaft 2 manually. However, when the rotor 4 having a diameter of 4 m is mounted to the main vertical shaft having a diameter of 10 cm, the circumference of the rotor 3 is 12.56 m, so that the ratio of the main vertical shaft 2 to the rotor 3 in circumference is 1/40. The force required to rotate the main vertical shaft 2 is 100, while the force for rotating the circumference of the rotor 3 having a diameter of 4 m is 1/40 or 2.5. Specifically, if wind power of 2.5 is applied to the wind-receiving blades 4 on the circumference of the rotor 3, the main vertical shaft 2 which requires the force of 100 for rotation can be easily rotated. Even a breeze having velocity of 2 m/sec can rotate the shaft 2. Slow rotation speed of the rotor 3 greatly increases torque for rotating the main vertical shaft 2.

FIG. 4 illustrates the rotor 3 covered with a cover 3f which is conical or semispherical. On the cover 3f, solar cells 16 are mounted. In FIG. 4, numeral 17 denotes a battery, 17a is a code, and 2a is a hole for the code 17a. When the sun appears, electricity is generated by the solar cells 16. Wherever the sun is in summer or winter or at morning or night, sun light is effectively radiated onto the surface of the solar cells 16 because the upper surface of the cover 3f is tilted. The angle of the cover 3f is less than 45 degrees with respect to a horizon, and sun light in winter can radiates the opposite surface. If the angle of the cover 3f should be very small, it will be difficult for the solar cells to receive radiation of morning or evening sunlight. Hence the angle of the cover 31 may be preferably 10 to 40 degrees.

With rotation of the rotor 3, the solar cells 16 on the cover 31 rotates and sun light radiates uniformly onto the surface of the whole solar cells 16 to increase sun light collection rate during a certain time thereby allowing electric power to be obtained from sun light energy effectively.

Electricity produced by the solar cells 16 is used for an automatic controller 14, a rotation sensor 13, an electromagnetic brake 15, an electromagnet 18 for reducing weight load, a remote control switch (not shown), an electromagnetic clutch (not shown) etc. in the casing 1a for the windmill 1.

When wind is stationary or when wind speed is low, a driving motor (not shown) is disposed in the casing 1a and driven by electricity produced by the solar cells 16 to help initial rotation of the windmill 1.

Examples of the wind-receiving blade will be described as below. The size thereof is corresponding to the rotor 4 having a diameter of 4 m.

FIG. 5 shows a right side view of the wind-receiving blade 4 of the first embodiment, and FIG. 6 is a horizontal sectional view taken along the line VI—VI in FIG. 5. The wind-receiving blade 4 comprises a support 41 and a wind-receiving portion 42, and molded from a soft elastic fiber reinforced plastics (FRP) or resin. The wind-receiving portion 42 is almost like a triangle and has a support body 42 for supporting a wind-receiving film 42b. The support body 42 has a curved portion and the film 42b is integrally formed on the support body 42. To achieve uniform thickness, the film 42b may be vinylon cloth or sheet in which resin is formed over the cloth, Thus, when the rear part of the wind-receiving portion 42 is subjected to strong wind pressure during rotation of the rotor 3, it can be curved like a caudal fin. Soft elastic fiber reinforced resin that forms the wind-receiving blade 4 includes unsaturated polyester resin, vinyl ester resin, epoxy resin, urethane resin, epoxy acrylate resin or urethane acrylate resin as matrix.

Elongation of the resin may be preferably set to 30 to 50% at rupture. Elongation less than 30% results in low elasticity, so that it is difficult to bend. Higher elongation leads easy bending to weaken wind-receiving power. Fiber reinforced material is a mixture of inorganic fibers and organic fibers, and its elongation may be preferably 30 to 40% at rupture.

In the fiber reinforcement material, the inorganic fibers may be glass fibers, carbon fibers, metal fiber mat, unidirectional material or woven textile, and the organic fibers may be aramid fibers, vinylon fiber, nylon fibers, polyester fibers, polyethylene fibers. The fibers selected therefrom are tough and elastic and elongation is 30 to 40% at rupture to keep suitable elasticity.

The inorganic fibers that range from 30 to 50% by weight and the organic fibers that ranges about 10% by weight are determined such that elongation is 30 to 40% at rupture. The mixture of the inorganic and organic fibers allows bending hardness and elasticity of the wind-receiving blade 4 to vary suitably.

The organic fibers comprises two or more mixtures rather than single material to achieve more advantageous effects and can be combined in the range of 25 to 50% by weight. Such elastic fibers improves elasticity and bending property. The fiber reinforced material is contained in the range of 10 to 50%. If they are below the range, rigidity will be poor, while bending will be poor if above the range.

In FIG. 2, the windmill 1 rotates in a direction of arrow "B" when wind blows in a direction of arrow "A". In the wind-receiving blade 4 on the left of the main vertical shaft 2, when the wind-receiving portion 42 is subjected to head wind, the speed of wind which passes along the inner surface of the wind-receiving portion 42 becomes higher than that of wind which passes along the outer surface, so that air density outside the wind-receiving portion 42 becomes lower negative pressure, and normal-pressure wind inside the wind-receiving portion 42 pushes to the rear portion of the wind-receiving blade 4 outward to rotate the rotor 3. When the wind-receiving blade 4 leeward of the main vertical shaft 2 is subjected to wind, the rear portion of the wind-receiving portion 42 is pushed to rotate the rotor 3. The wind-receiving blade 2 at the right of the main vertical shaft 2 in FIG. 2 is subjected to wind at the inner surface to generate rotation-driving force. In the leeward wind-receiving blade 4 of the main vertical shaft 2 in FIG. 2, when wind is strong, the rear portion is curved leeward to reduce wind resistance.

The wind power generator according to the present invention provides experimental results as below:

AC generator: 2.5 KW/h , diameter of the rotor: 4 m

Weight of the rotor: 150 kg

Wind-receiving blades: seven (300 mm×1500 mm)

Wind speed: 1.5 m/s to 2.1 m/s, Rotation speed: 51 to 56 rpm

Although rotation speed of the rotor is low, rotation torque is high.

A year consists of 365 days or 8760 hours. A known horizontal wind power generator will not be economical unless wind over speed of 2 m/sec blows for more than 2000 hours.

However, if wind having speed of 1 m/sec to 4 m/sec blows for 3000 hours a year, the wind power generator according to the present invention could be utilized for 5000 hours a year together with wind having speed over 4 m/sec thereby increasing collection rate and utilizing rate of wind power greatly.

In the embodiments, the wind-receiving blades 4 are provided outside of the circumferential ring 3c, but may be provided inside the ring 3c. If the circumferential ring 3c is disposed outside the wind-receiving blades 4, wind pressure resistance applied to the wind-receiving blades 4 is offset by kinetic energy of the circumferential ring 3c.

Figure 7:
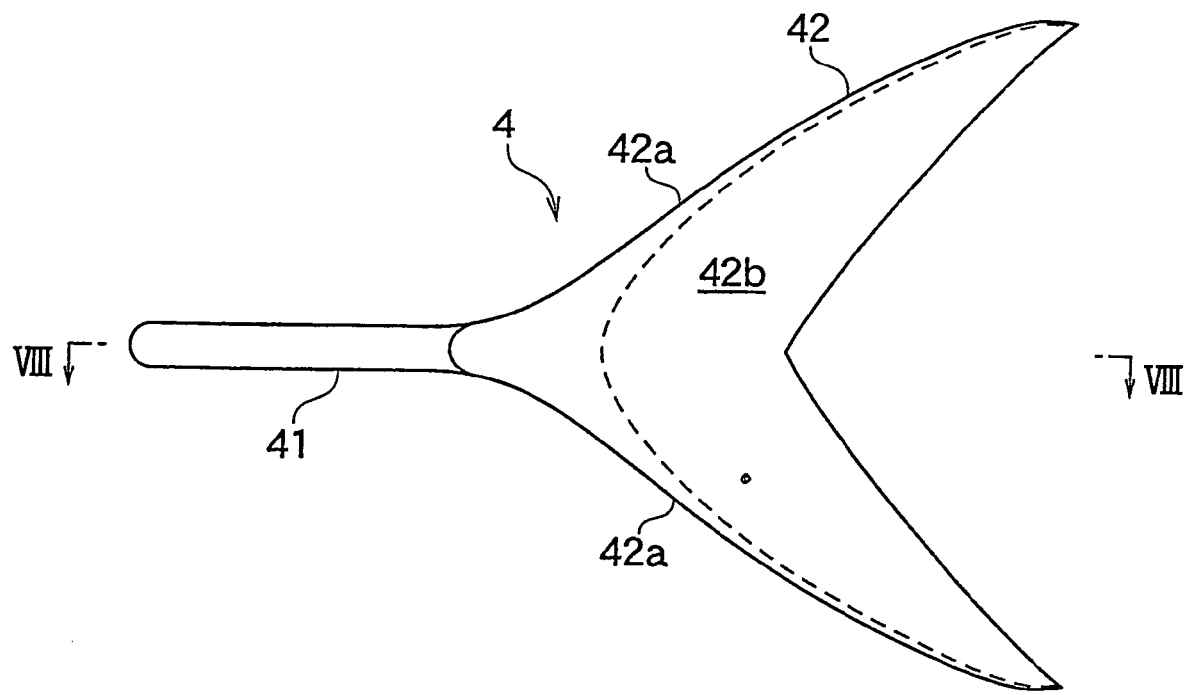
FIG. 7 is a right side view of the second embodiment of a wind-receiving blade according to the present invention.
Figure 8:
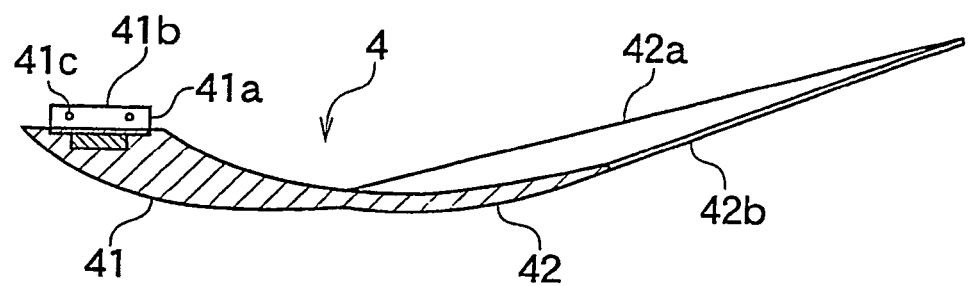
FIG. 8 is a horizontal sectional plan view taken along the line VIII—VIII in FIG. 7.

FIG. 7 is a right side view of the second embodiment of a wind-receiving blade, and FIG. 8 is a horizontal sectional view taken along the line VIII—VIII in FIG. 7. The same numerals are allotted to the same members as above and description thereof is omitted. In the second embodiment, a mounting support 41 is long and the rear portion thereof can be bent.

The mounting support 41 is made of soft elastic resin and the rear portion is thin and bendable. When strong wind blows, it can be bent to prevent breakage.

When the wind-receiving blade 4 is subjected to head wind, force is applied to push outwards from the inside to rotate the rotor 3 owing to variation in air pressure in which the outside becomes negative pressure because the outer length is larger than the inner length.

FIG. 9 is a left side view of the third embodiment of a wind-receiving blade, and FIG. 10 is a top plan view. The same numerals are allotted to the same members and description thereof is omitted.

In the third embodiment, the wind-receiving blade 4 comprises a mounting support 41 and a vertical wind-receiving portion 42, which comprises a vertical support bone 42a. and a rectangular wind-receiving film plate 42b supported by the support bone 42a. As shown in FIG. 10, the mounting support 41 has horizontally a reversed L-shaped section and has a U-shape sectioned fixing portion 41a at the end. The fixing portion 41a is mounted such that an end face 41b is in parallel with a tangential line "L" at the circumference of a rotor 3 of a windmill 1. The mounting support 21 is tapered and projected forwards by 50 cm and transversely by 70 cm. This is because the wind-receiving blade 4 far from the main vertical shaft 2 to strengthen leverage effect. Numeral 41c denotes a thread bore through which a bolt is screwed.

The wind-receiving portion 42 is fixed to the mounting support 41 and tilted at 13 to 16 degrees to the end surface 41b of the mounting support 41. The wind-receiving film plate 42b is curved from the support bone 42a, and a lobe 42c is formed in the wind-receiving portion 42 to increase rotation-driving force.

In the wind-receiving blade 4 corresponding to the rotor 4 which has a diameter of 4 m, the support bone 42a is 2 m in height. The front portion of the taper support bone 42a is 3 cm thick, and the rear end is 2 to 5 mm thick. The blade 4 is about 7 cm wide.

The wind-receiving film plate 42b connected to the rear end of the support bone 42a has the same height as the support bone 42a and has a width of about 30 cm. Thickness at the front end of the film plate 42b is 2 to 5 mm, the same as that of the rear end of the support bone 42a, and becomes smaller towards the rear end which is 0.3 to 1 mm thick. The numerical values are only for illustration.

Figure 12:
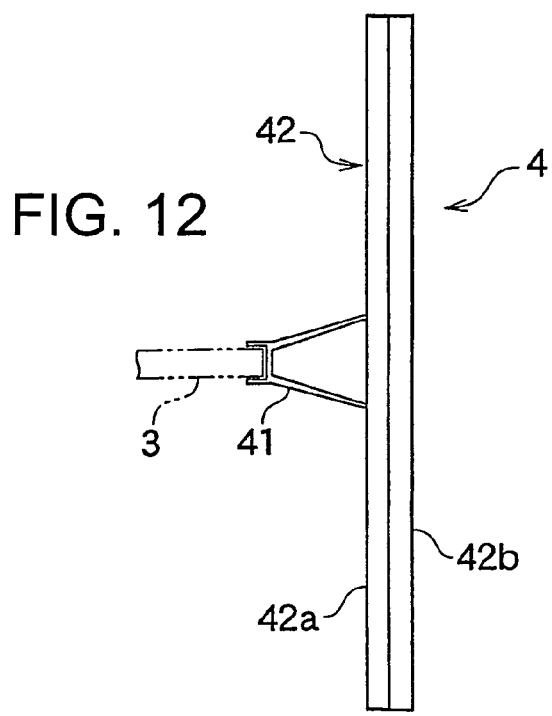
FIG. 12 is a front view of the fourth embodiment of a wind-receiving blade according to the present invention.

As shown in FIG. 12, when the wind-receiving blade 4 is provided on the rotor 1 of the windmill 1, an angle of the wind-receiving portion 42 ranges from 13 to 16 degrees to wind blow produced over the circumference of the rotor 3, and the rounded support bone 42a comes against wind to cause negative pressure in the front inside the wind-receiving portion 42 to generate thrust.

Figure 11:
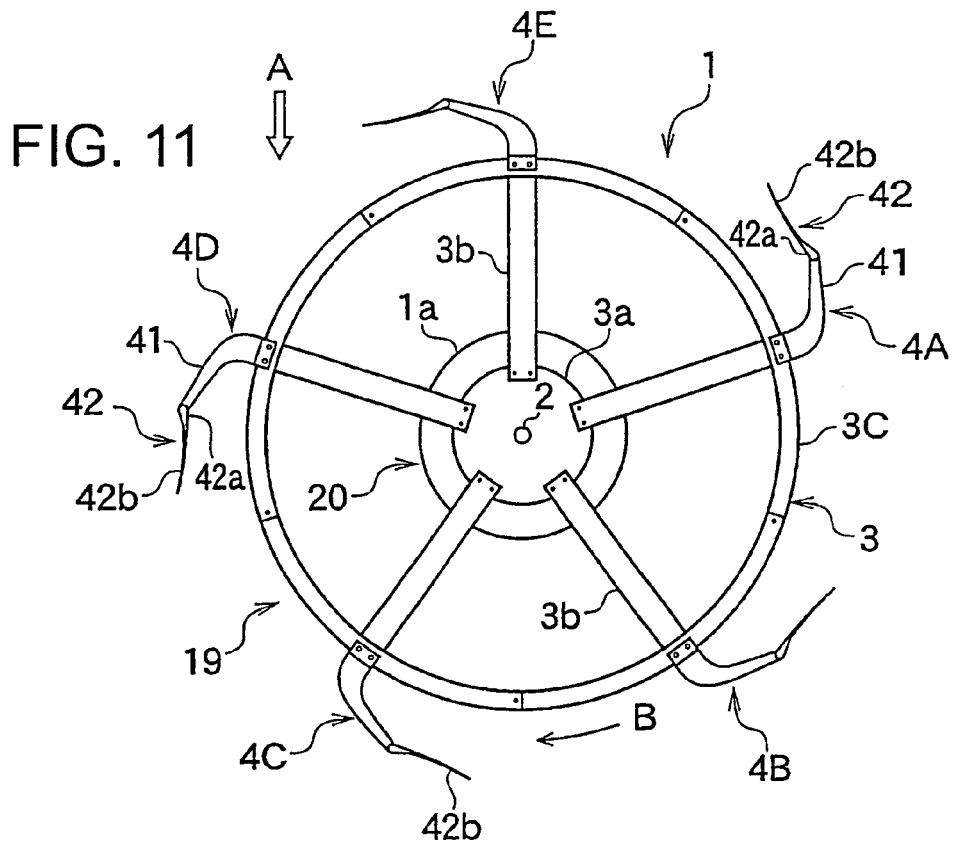
FIG. 11 is a top plan view of a windmill in which the wind-receiving blade in the third embodiment is mounted.

In FIG. 11, when wind blows in a direction of arrow "A", the wind-receiving blades 4A,4B on the right of the main vertical shaft 2 receives fair wind to generate rotation thrust. In the windward wind-receiving blade 4A, the whole wind-receiving film plate 42b is curved inwards in proportion to wind pressure and receives more wind pressure to generate strong thrust.

In the leeward wind-receiving blade 4C on the left of the main vertical shaft 2, the whole wind-receiving film plate 42b is warped outwards in proportion to wind pressure to generate rotational thrust such as rotary force for rotating a propeller. By warping the wind-receiving film plate 42b, wind velocity along the inner surface becomes higher than that along the outer surface, so that pressure on the outer surface is lower than that on the inner surface thereby causing rotation-driving force.

In the wind-receiving blade 4D on the left of the main vertical shaft 2, velocity of wind, which passes along the inner surface of the wind-receiving film plate 42b becomes higher than that along the outer surface, so that pressure of the inside of the wind-receiving film plate 42b becomes lower than that of the outside thereby causing rotation-driving force.

When the wind-receiving blade 4E on the left of the main vertical shaft 2 receives a head wind, the wind-receiving film plate 42b is curved inwards in proportion to wind pressure to reduce wind-hitting area. By the bending of the wind-receiving blade 4E, the outer surface of the wind-receiving blade 4E becomes a tilted surface along which wind passes to give rotation-driving force. Also, the rear end of the wind-receiving blade 4E opposes the wind, and similar to the wind-receiving blade 4D, pressure on the outer surface becomes lower than that on the inner surface to cause driving force.

As mentioned above, depending on position of the wind-receiving film plate 42b on the circumference of the rotor 3, wind pressure and direction of bending lead opposite directions both of which increase rotation-driving force.

The wind-receiving film plate 42b comprises a thin elastic body and can be bent uniformly inwards and outwards and recovered uniformly. Especially the support bone 42a is provided only on the front end and is excellent in bending property.

The wind-receiving film plate 42b is bent at the base by strong wind pressure and at the rear end by weak wind pressure. Depending on difference in right and left wind pressure, it is pressed in right and left directions respectively.

In FIG. 11, when the rotor 3 of the windmill 1 start to rotate, rotation inertia increases owing to heavy weight of the circumferential ring 3c of the rotor 3, so that the rotor 3 is faster than wind. Thus, the wind-receiving portion 42 of the wind-receiving blade 4 receives air resistance involved faster rotation. However, as shown in FIG. 11, the wind-receiving portion 42 is shaped to follow the circumference of the rotor 3, so that it is not difficult to be subjected to wind pressure resistance involved by rotation. Even if the rear end of the wind-receiving film plate 42 is a little pressed and bent inwards by wind pressure, it is put within the orbit of the support bone 42a to prevent further wind resistance.

However, the wind-receiving portion 42 rotates while the front end of the support bone 42a projects inwards. So with rotation, negative pressure is generated inside the front of the wind-receiving portion 42 to give rotation-driving force. With increase in rotation speed, the rear end of the wind-receiving film plate 42b rotates while it is pressed out. This is because inertia exceeds air resistance.

Figure 14:
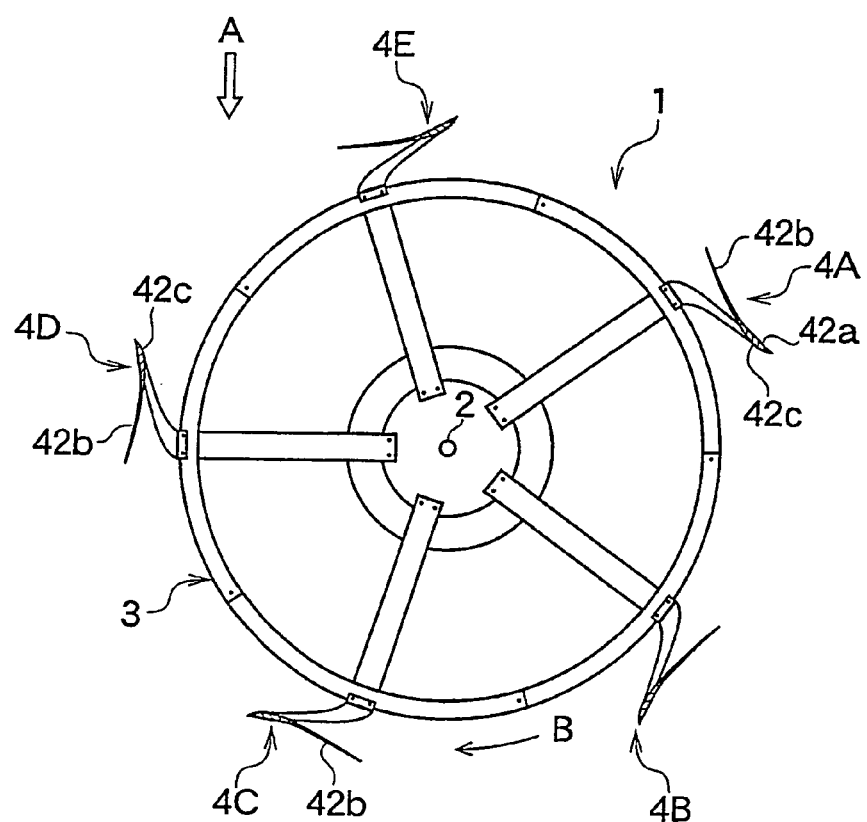
FIG. 14 is a top plan view of a windmill in which the wind-receiving blade in FIG. 12 is mounted.

FIG. 12 is a front view of the fourth embodiment of a wind-receiving blade 4; FIG. 14 is a central horizontal sectional view in FIG. 12; and FIG. 14 is a top plan view which shows that the wind-receiving blade 4 in FIG. 12 is mounted over a rotor. The same numerals are allotted to the same members as those in the foregoing embodiments and description thereof is omitted.

A wind-receiving portion 42 in the fourth embodiment is characterized by comprising the structure opposite to that in the third embodiment.

Figure 13:
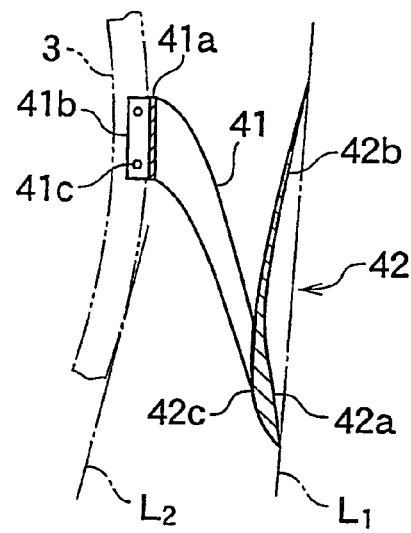
FIG. 13 is a central horizontal sectional view of the fourth embodiment of the wind-receiving blade.

As shown in FIG. 13, a support bone 42a is bent to form a lobe 42c for generating rotation-driving force. A wind-receiving film plate 42b connected to the rear end of the support bone 42a is curved to meet with the support bone 42a. The wind-receiving portion 42 is totally curved.

A mounting support 41 is slantingly projected in a direction of rotation of a rotor 3 opposite to the third embodiment. The support bone 42a of the wind-receiving portion 42 is fixed to the end of the mounting support 41, and the rear end of the wind-receiving film plate 42b is corresponding in position to a base surface 41b of the mounting support 41.

Preferably, a straight line L1 between the ends of the wind-receiving portion 42 is inclined inwards and rearwards to the base surface 41b of the mounting support 41. An angle of the inclination ranges from 13 to 16 degrees to a tangential line at the rotor 3 on a straight line between the end of the wind-receiving portion 42 and a main vertical shaft 2.

In the fourth embodiment, as shown in FIG. 12, the end of the mounting support 41 is separated vertically to expand its height thereby fixing the wind-blowing portion 42 firmly.

The support bone 42a of the wind-receiving portion 42 is, for example, 180 cm in height, 15 cm in length and about 3 cm in the maximum thickness. The support bone 42a tapers to form the rear end to be 0.3 to 1 mm in thickness.

The wind-receiving film plate 42b connected to the rear end of the support bone 42a is the same as the support bone 42a in height, and 30 cm in length. The front end is the same as the support bone 42a in thickness to keep smooth relationship, and the rear end of the plate 42b is 0.3 to 1 mm in thickness.

Hence the wind-receiving film plate 42b of the wind-receiving portion 42 is bent depending on strength of wind pressure which is applied thereto. Specifically, when wind is weak, the rear end of the wind-receiving film plate 42b is waving, and when wind is strong, it is bent from the middle or the front end depending on wind pressure.

In FIG. 14, when wind blows in a direction of arrow "A", a wind-receiving blade 4A,4B on the right of a main vertical shaft 2 is subjected to a fair wind to receive rotation-driving force.

In a leeward wind-receiving blade 4C on the left of the main vertical shaft 2, the rear end of the wind-receiving film plate 42b is warped rearwards to become like a propeller and pressed in a direction of rotation to generate rotation-driving force.

In a wind-receiving blade 4D on the left of the main vertical shaft 2, wind along the inner surface of the wind-receiving film plate 42b is faster than that along the outer surface, so that the front in the support bone 42a becomes negative pressure. Atmospheric pressure is applied to the direction of rotation of the wind-receiving portion 42.

In a wind-receiving blade 4E, the rear end of the wind-receiving film plate 42b is warped inwards to become like a propeller, so that it is pressed in a direction of rotation generate driving force of rotation. Wherever the wind-receiving blade 4 is positioned, it is subjected to wind to change received wind force to driving force without resistance to wind.

In FIG. 14, when the rotor starts to rotate, a circumferential ring increases inertia, and the rotor 3 becomes faster than wind owing to the weight of the circumferential ring 3c. Then, the rear end of the wind-receiving film plate 42b of the wind-receiving blade 4 is inevitably curved outwards owing to centrifugal force and wind pressure.

Because of the lobe 42c on the wind-receiving portion 42, wind which passes along the inner surface is faster than that along the outer surface to cause negative pressure in the front of the support bone 42a to generate rotation-driving force.

As shown in FIG. 13, in the wind-receiving portion 42, the support bone 42a is about 3 cm in thickness and small in depth, so that wind resistance during rotation becomes small significantly even when the whole wind-receiving portion 42 is greatly curved. In particular, the wind-receiving film plate 42b which rotates within an orbit of the support bone 42a does not receive wind resistance on the side. Even if the rear end of the wind-receiving film plate 42b moves outwards owing to centrifugal force and wind pressure, it is subjected to outer wind pressure during rotation, so that it rotates within the orbit of the support bone 42a.

Specifically, a general vertical blade provides advantage that the whole depth is subjected to a fair wind. However, on the contrary, acceleration is restrained.

In the fourth embodiment of the wind-receiving blade 4, what is subjected to wind resistance during rotation is only thickness and depth of the support bone 42a. The wind-receiving film plate 42b swings at the rear end during rotation and is covered with the support bone 42a thereby functioning a guide for wind which passes along the surface.

In the fourth embodiment of the wind-receiving blade 4, the rotor 3 is 4 m in diameter, the circumferential ring 11 is 250 kg in weight, the main vertical shaft 2 is 10 cm in diameter, and the smaller-diameter portion of the main vertical shaft 2 is 1 cm in diameter. When the windmill 1 rotates as shown in FIG. 14, average wind velocity is 7 m/sec and 60 rpm.

This means that the wind-receiving blade 4 rotates at 12.56 m/sec and is about 1.8 times as wind velocity.

Generally a vertical shaft windmill has collection rate of 35% and never rotates faster than wind. So it is clearly distinguishable.

As soon as the rotor 3 of the windmill 1 rotates, it adds kinetic energy as flywheel. By the rotation-driving force, the wind-receiving blade 4 which has the lobe 42c for increasing rotation-driving force produces negative pressure in the front of the wind-receiving portion 42 to generate rotation-driving force for acceleration thereby providing multiplier effect of the rotor 3 as flywheel and rotation-driving force of the wind-receiving portion 4.

Figure 15:
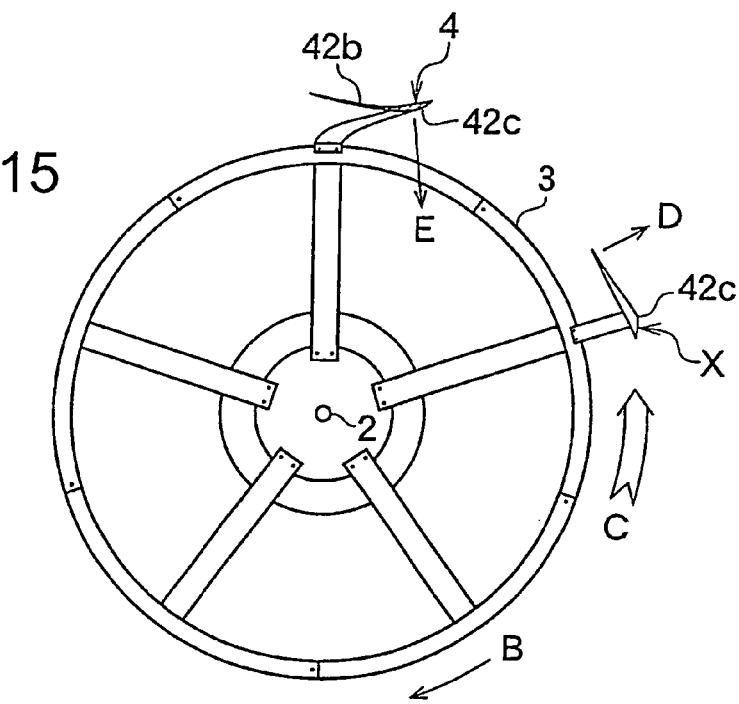
FIG. 15 is a top plan view for describing force to the wind-receiving blades mounted to a rotor.

FIG. 15 is a view which shows relationship of the wind-receiving blade 4 in the fourth embodiment during rotation of the rotor 3 to driving force of lateral blade "X".

In FIG. 15, when the rotor 15 rotates in a direction of arrow "B", wind pressure or opposite force "C" is generated in an opposite direction.

The blade "X" which has the lobe 42c on the outer surfac generates a force in a direction of arrow "D", so that the rear end of the wind-receiving portion 42 receives outward force to apply rotation-driving force to the rotor 3.

In the fourth embodiment of the wind-receiving blade 4 in FIG. 15, the lobe 42c for increasing rotation-driving force is formed on the inner surface of the wind-receiving portion 42 to generate negative pressure in the front of the wind-receiving portion 42 to produce rotation-driving force in a direction of arrow "E". The front in the wind-receiving portion 42 is subjected to inward rotation-driving force to rotate the rotor 3.

Comparing the two examples, in the former, the rear end of the wind-receiving portion 42 is subjected to rotation-driving force outwards, while in the latter, the front end of the wind-receiving portion 42 is subjected to rotation-driving force inwards. There seems to be difference in position where rotation-driving force is applied.

However, in FIG. 15, in the blade "X" in which the lobe 42c is formed on the outer surface, rotation-driving force is directed outwards. To generate outward force at the rear end of the wind-receiving portion 3, even if inward force is applied to the front end like leverage, it is restrained by the mounting support 2 to decrease efficiency.

In the meantime, in the wind-receiving blade 4 in the fourth embodiment in FIG. 15, the rotation-driving force "E" is prior to a straight line between the main vertical shaft 2 and the base of the mounting support 41 to act directly on the rotor 3 to increase efficiency.

A blade-like wing in an airplane is provided to elevate the airplane. Thus, when the lobe is formed on the outer surface of the wind-receiving blade, outward pulling force is applied to decrease rotation-driving force to increase damaging rate with centrifugal force.

In the windmill 1, the rotor 3 is circular, and the wind-receiving blades 4 on the circumference rotates like an arc. To rotation-driving force from the shape of the wind-receiving blade 4, it is preferable for rotation-driving force to apply in a direction along the circumference of the rotor 3 inside the wind-receiving blade 4. The wind-receiving blade in the fourth embodiment is very suitable.

Figure 16:
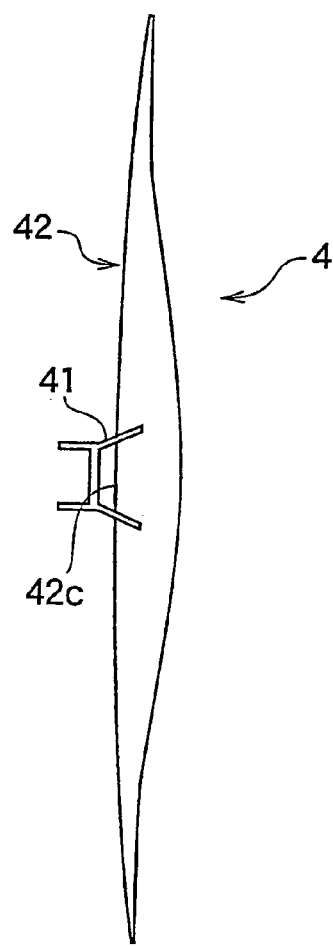
FIG. 16 is a front view of the fifth embodiment of a wind-receiving blade.
Figure 17:
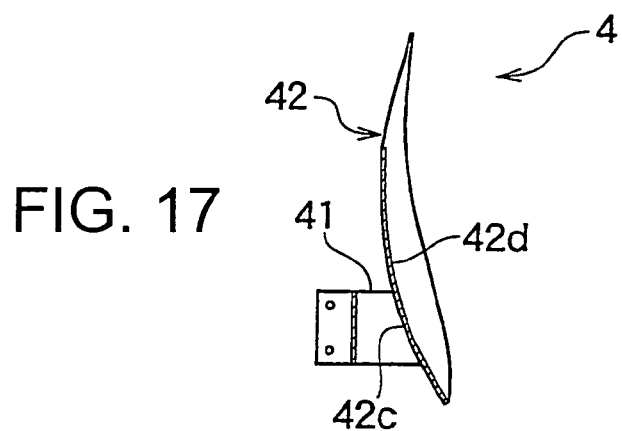
FIG. 17 is a central vertical sectional view of the fifth embodiment of the wind-receiving blade.
Figure 18:
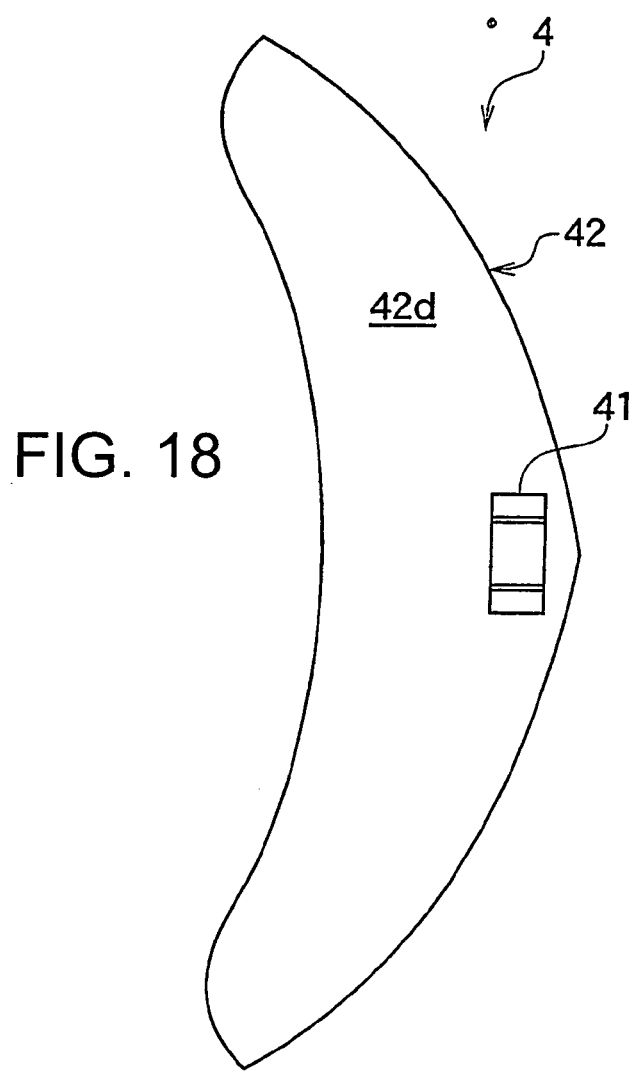
FIG. 18 is a left side view of the fifth embodiment of the wind-receiving blade.

FIG. 16 is s front view of the fifth embodiment of a wind-receiving blade 4; FIG. 17 is a central vertical sectional view; and FIG. 18 is a left side view. The same numerals are allotted to the same members as those in the foregoing embodiments and description thereof is omitted.

The wind-receiving blade 4 in the fifth embodiment comprises a thin plate having a recess 42d to form a lobe 42c. Thus, wind that passes along the inner surface of a wind-receiving portion 42 turns aside vertically to produce strong negative pressure on the lobe 42c to generate strong rotation-driving force.

FIG. 19 is a top plan view of the sixth embodiment of a wind-receiving blade. The same numerals are allotted to the same members as those in the foregoing embodiments, and description thereof is omitted. The wind-receiving blade 4 is hollow. The outer surface of a wind-receiving portion 42 is formed as a curve which complies with an orbit of the end of the wind-receiving portion 42. The wind-receiving portion 42 projects on the inner surface to form a lobe 42c for generating rotation-driving force.

The wind-receiving blade 4 increases wind resistance during rotation, and is not suitable for high-speed rotation. However, the lobe 42c generates high rotation-driving force, and it is suitable for a heavy low-speed rotor 3 to generate high torque.

The shape of the wind-receiving blade 4 can be determined depending on use on whether to rotate a rotor 3 at speed higher than wind velocity or to obtain high torque in spite of low speed.

The shape and material of the wind-receiving blade 4 is not limited to the embodiments, and can be selected without departing from the scope of claims. The sizes as above are merely examples and are not limited thereto. The size, shape and number of the wind-receiving blade 4 may be suitably selected depending on diameter, weight and required torque of the rotor 3.

The windmill of the present invention can be stably rotated by throwing pressurized water from a hose. Therefore, the wind-receiving blade may be replaced with a water-receiving blade, and the windmill may be replaced with a waterwheel.

INDUSTRIAL APPLICABILITY

A wind power generator according to the present invention has small size and high torque to produce high electricity.

It is not limited by a direction of wind, and placed on a roof of a house to provide home generation of electricity. It is also suitable in a land, a mountain and a desert because the lightweight windmill is easily transported and assembled.

The windmill according to the present invention can be used not only for generation of electricity but also for flour milling, water pumping and other purposes.

What is claimed is:

1. A windmill comprising:
a main vertical shaft;
a rotor mounted to an upper end of the main vertical shaft to constitute a flywheel; and
a plurality of vertical wind-receiving blades equally spaced on an outer circumference of said rotor, each of said plurality of wind-receiving blades comprising an outer wind-receiving portion and an inner mounting support, the wind-receiving portion having a lobe on an inner surface, an outer surface of the wind-receiving blade being placed at the farthest position from the main vertical shaft, the lobe generating negative pressure in the front of the wind-receiving blade to produce rotation-driving force of the wind receiving blade, wherein said rotor comprises a circumferential ring and a plurality of support arms extending radially between the main vertical shaft and the circumferential ring which is fixed to each said mounting support of the wind-receiving blades.

2. A windmill comprising:
a main vertical shafr
a rotor mounted to an upper end of the main vertical shaft to constitute a flywheel; and
a plurality of vertical wind-receiving blades equally spaced on an outer circumference of said rotor, each of said plurality of wind-receiving blades comprising an outer wind-receiving portion and an inner mounting support, the wind-receiving portion having a lobe on an inner surface, an outer surface of the wind-receiving blade being placed at the farthest position from the main vertical shaft, the lobe generating negative pressure in the front of the wind-receiving blade to produce rotation-driving force of the wind receiving blade, wherein a cover is mounted over an upper surface of the rotor and has an upper inclined surface on which solar cells are mounted.

3. A windmill as claimed in claim 2 wherein the inclined surface of the cover has angles for 10 to 40 degrees to a horizon.

4. A windmill wind-receiving blade vertically mounted around a rotor having a vertical shaft to construct a flywheel, comprising:

an inner mounting support and an outer wind-receiving portion, the rear end of which can be bent horizontally with wind pressure in use, the inner mounting support and the outer wind-receiving portion being integrally molded by soft elastic fiber reinforced resin, wherein said outer wind-receiving portion comprises a support bone and a wind-receiving film plate, said support bone being tapered and connected at the rear end to the wind-receiving film plate, the thickness of a front end of the wind-receiving film plate being almost the same as that of a rear end of the support bone and reduced rearwards.

5. A windmill wind-receiving blade vertically mounted around a rotor having a vertical shaft to construct a flywheel, comprising:

an inner mounting support and an outer wind-receiving portion, the rear end of which can be bent horizontally with wind pressure in use, the inner mounting support and the outer wind-receiving portion being integrally molded by soft elastic fiber reinforced resin, wherein a lobe is formed on an inner surface of the wind-receiving portion to generate rotation-driving force.

6. A windmill wind-receiving blade vertically mounted around a rotor having a vertical shaft to construct a flywheel, comprising:

an inner mounting support and an outer wind-receiving portion, the rear end of which can be bent horizontally with wind pressure in use, the inner mounting support and the outer wind-receiving portion being integrally molded by soft elastic fiber reinforced resin, wherein the wind-receiving blade is hollow, an outer surface of the wind-receiving portion being formed to pass along an orbit of rotation of an outer front end of the wind-receiving portion.

* * * * *